United States Patent Office 2,701,443
Patented Feb. 8, 1955

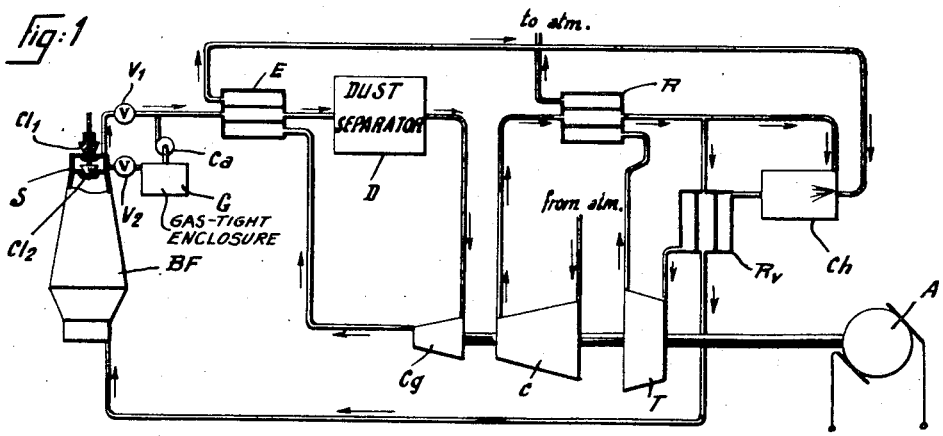
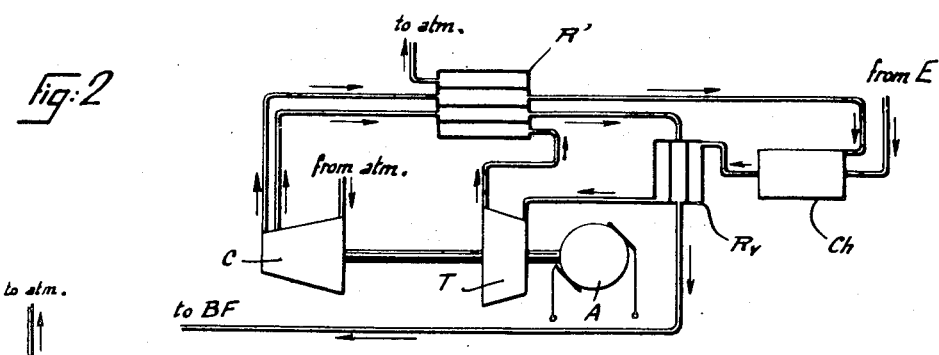
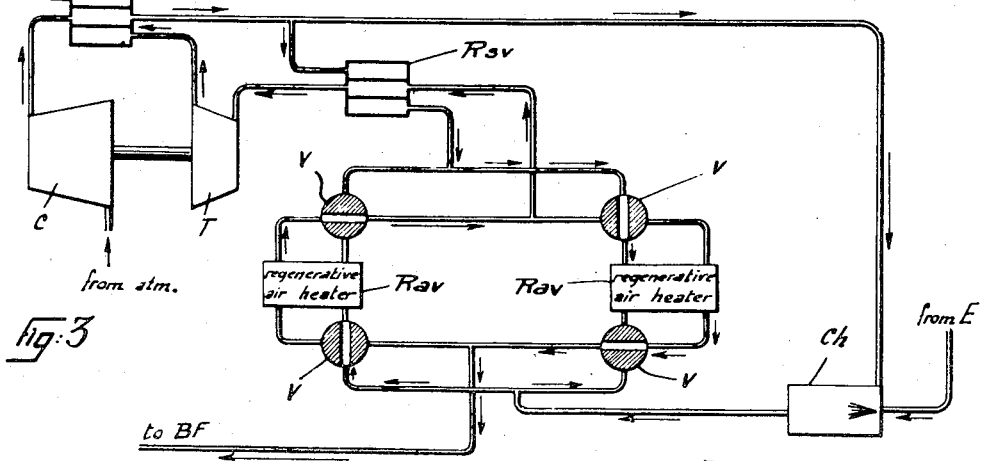

2,701,443

COMBINED SUPERCHARGED BLAST-FURNACE AND GAS TURBINE PLANT

Marcel Henri Louis Sédille, Paris, France, assignor to Societe Rateau (Societe Anonyme), Paris, France, a company of France, and René Anxionnaz, Paris, France Application July 20, 1948, Serial No. 39,596

Claims priority, application France August 4, 1947

5 Claims. (Cl. 60—39.12)

The use of gas turbines may be interesting from various points of view in blast furnace plants since combustible gas is available at the top of the furnace. On the other hand, it is known that blast furnace blowing-engines can be driven by a gas turbine plant and the air-compressors of this plant can be combined with the blowing-engines themselves. Finally it is possible to use the combustible gas taken from the top of the blast furnace in order to produce power by means of a gas turbine plant.

Besides the interest they present as motors, gas turbine sets may be used in blast furnace plants, in order to supercharge different parts of the plant such as the blast furnace itself and thus permit either an increase of the output of the existing plant or a reduction of space occupied and of the price of new plants to be erected.

It has already been proposed to operate air heaters under pressure, fed by the exhaust gas of the turbine, for the blowing of the blast furnace, but that is only one part of the plant and to limit the profit of that idea to only one of the parts of the plant is of but moderate interest.

The present invention, which concerns combinations of gas turbine plant and its auxiliaries with a blast-furnace plant, gives the advantage of supercharging parts of the plant that were not considered up to now or even each part of the plant as well as the auxiliaries. Amongst these parts, the most important in that respect is the blast furnace itself. It is also convenient that the dust separating plant that is generally provided at the top of blast furnaces for the purification of the combustible gas, should receive these advantages.

The following description, with reference to the accompanying drawings which are given only as examples will enable it to be fully understood how the invention may be carried out, it being understood that the features which appear from the text and also from the drawings form parts of the said invention.

Fig. 1 represents the most simple diagram of the arrangement according to the invention, Fig. 2 a variant taking the compressed air for the blast furnace at an intermediate stage of the compressor, Fig. 3 the use of a compound regenerative heater for high-temperature compressed air.

Figure 8:
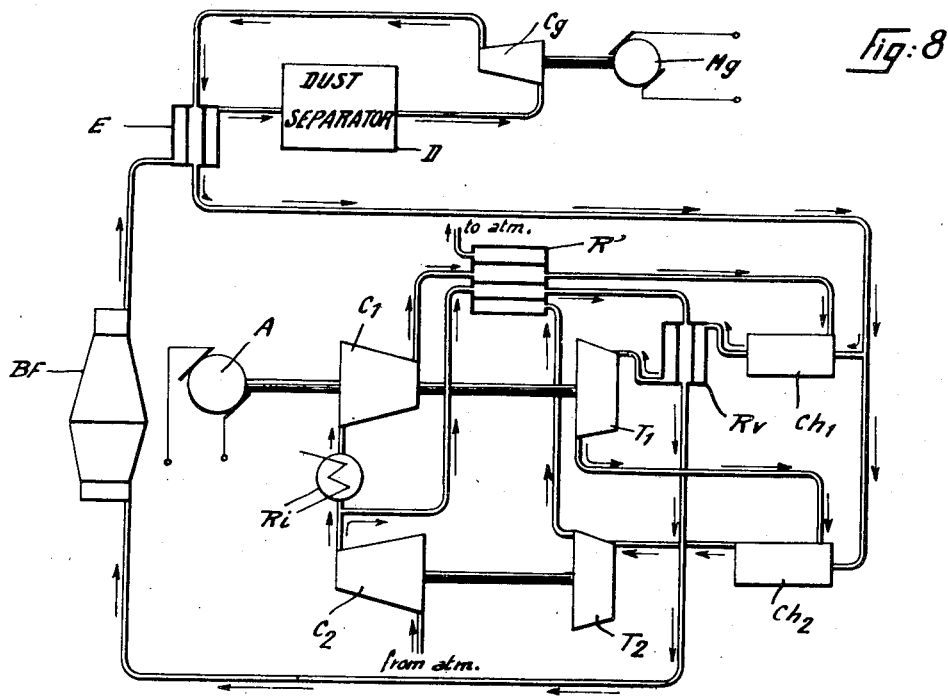
Figure 9:
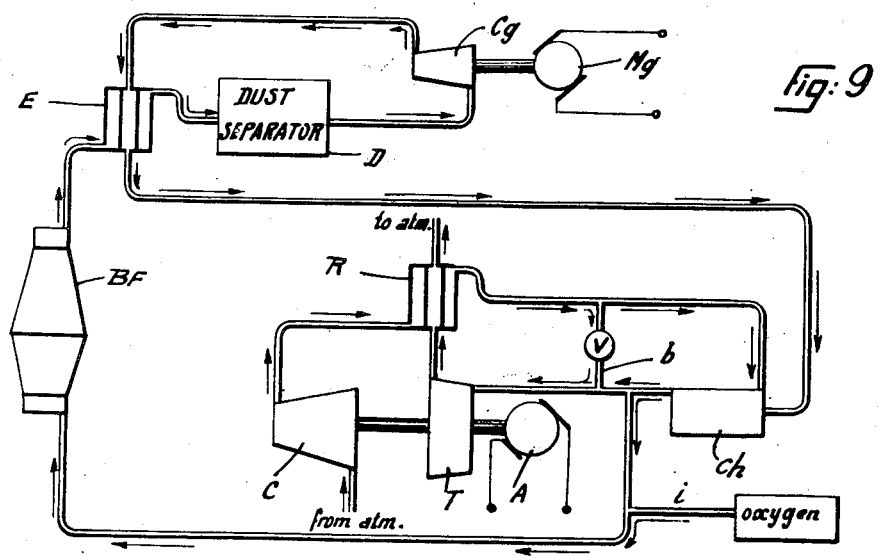

Fig. 8 relates to a plant including two sets of gas-turbines with intermediate superheating of the gas, and cooling of the air during the compression. Finally Fig. 9 shows a plant without any compresed air reheater, the hot air being tapped off at the outlet of a combustion chamber and the oxygen content being obtained by an injection of this gas.

The plant in Fig. 1 comprises a blast furnace BF, a heat exchanger E for the recovery of heat from the combustible gas taken from the top of the blast furnace, a dust separating device D of any known type, and a gas compressor $C_g$, compensating for the losses of pressure of the gas which passes into the blast furnace, the heat exchanger and the dust separator. There are also a compressor C for the combustion air, a driving gas turbine T, a recuperator R for the recovery of the heat from the exhaust gas of the turbine, and an electric generator A which can be an alternator for instance. A metallic preheating device $R_v$ preheats the compressed air for the blast furnace. There is a combustion chamber $C_h$ for purified gas. Arrows show the direction of flow of the fluids in the connecting pipes of the parts of the arrangement.

This plant operates as follows:

The compressor C supplies compressed air for combustion purposes both to the supercharged blast furnace BF and to the combustion chamber $C_h$, the effluent of the latter being used for operating the turbine T driving the compressors C and $C_g$ and the external load A. Before escaping to atmosphere, the exhaust gases of the turbine T yield part of their calories to the air discharged by the compressor C when the two fluids flow in heat-exchange relationship in R. The compressed air for the blast furnace BF is further heated by the effluent of the combustion chamber $C_h$, in the preheater $R_v$.

The gases issuing at the top of the blast furnace BF at superatmospheric pressure, contain an important proportion of combustible gases. These gases are burnt in the combustion chamber $C_h$ after having been purified in the dust separator D and after their pressure has been rasied, by the compressor $C_g$, to a value substantially equal to that of the discharge of compressor C. These purified combustible gases are heated, in the heat exchanger E, by the exhaust gases (or non-purified combustible gases) discharged by the blast furnace BF.

These exhaust gases still have an important pressure: with an air supply pressure of about 4 kgs. per sq. cm., for instance at the bottom of the blast furnace BF, the pressure of the effluent, at the top, will be of about 2 kgs. per sq. cm. It is only required of the auxiliary compressor $C_g$ to compensate for the pressure loss in the blast furnace BF, the heat exchanger E and the dust separator D.

As the blast furnace operates at super-atmospheric pressure, a pressure lock is provided at the top end of the furnace, in order to allow charging operations without undue loss of pressure, so that the pressure obtaining within the shaft of the furnace may be maintained throughout. The pressure lock illustrated in Fig. 1 is of a conventional type, with a double bell and hopper arrangement. However, even in such devices, gas leakages occur when the bells are actuated, due to the difference in pressure between the shaft and the bell space or intermediate compartment on the one hand, and between the latter and the atmosphere on the other hand.

In Fig. 1, the bell space S which is a gas-tight compartment, is connected to the above-described flow circuit (E, D, $C_g$, etc.) through a valve $V_1$. This valve $V_1$ is by-passed by a branch circuit including a valve $V_2$, a gas-tight enclosure G and an auxiliary compressor $C_a$ discharging into the above flow circuit upstream of E.

During normal operation of the blast furnace, the top bell $Cl_1$ of the pressure lock is closed while the bottom bell $Cl_2$ is opened; valve $V_1$ is opened, whereas valve $V_2$ is closed. Thus, the gases are allowed to flow from the shaft of the furnace, through the bell space S and the valve $V_1$, into the external circuit.

When charging is to be effected, the valve $V_1$ and the bottom bell $Cl_2$ are closed, and the valve $V_2$ is opened, thus allowing the gas filling the space S to expand into the enclosure G from which it is sucked up by the auxiliary compressor $C_a$ and discharged into the external circuit at normal operation pressure.

The valve $V_2$ is then closed, the bell $Cl_1$ is opened and charging is effected in the ordinary way.

It is to be noted that in the arrangement described above, the supply of compressed air for the blast furnace BF and of available power through the external load A, is insured by the single turbine-compressor unit T—C.

In the example of Fig. 1, the air supplied to the blast furnace BF and that supplied to the combustion chamber $C_h$ are at the same pressure.

This is, however, not indispensable, as shown in Fig. 2, which only differs from Fig. 1 in that the compressed air for the blast furnace BF is discharged at an intermediate stage of the compressor C and preheated in a recuperator $R'$ having two separate cold gas flues: one for the blast furnace air and the other for the combustion chamber air which is at a higher pressure.

The compressed air preheater $R_v$ (Figs. 1 and 2) is to be of the metallic surface type, which is an appropriate choice when the preheating temperature of the air does not exceed 700 to 800° C. In that respect it is advantageous to raise the pressure of air supplied to the furnace up to the feeding pressure of the gas turbine, the hot gas from the combustion chamber $C_h$ and the compressed air being then approximately at the same pressure in the compressed air preheater $R_v$. This suppresses any mechanical stress in the flues or exchanging surfaces of the preheater.

When the preheating temperature of the compressed air is higher than the above limit, namely 700 to 800° C., it is necessary to use regenerative air heaters which can accumulate heat and through which hot gas and compressed air pass alternatively. This circulation is obtained through a set of adequate valves V. Here again, the increased pressure of the air presents a complementary advantage since the exchanger works during the two phases with fluids having approximately the same pressure, which reduces the leaks during handling of the valves. It is also possible, according to a variant of the invention, to associate the two types of compressed air preheater, that is to start the preheating of the air in a metallic surface preheater and to further it in regenerative furnaces. Fig. 3 shows, as an example, such an arrangement in which the air heating device is divided into a surface heat-exchanger $R_{sv}$ at a moderate temperature for the first phase of preheating and a pair of regenerative furnaces $R_{av}$ giving the second phase of preheating at high temperatures, heating gas and heated air preferably circulating in opposite directions, according to the arrows shown in the figure.

Figure 4:
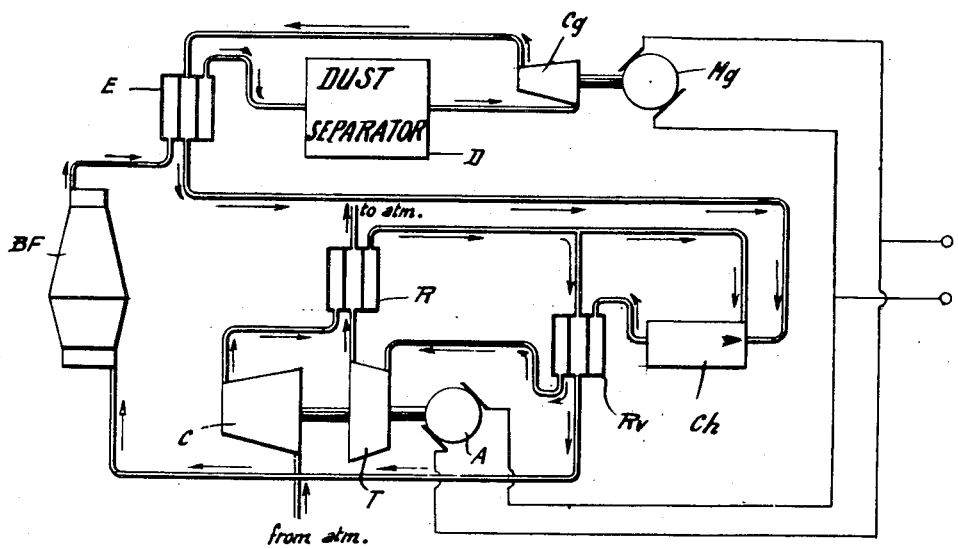
Fig. 4 represents a variant of the invention with a separate device for the control of the compressor which is intended to compensate for the losses of pressure in the dust separating device of the combustible gas from the top of the blast furnace.

Fig. 4 shows a variation in the above-described described species. The gas compressor $C_g$ is mechanically independent from the gas turbine plant T—C. In the species illustrated in Fig. 4, the compressor $C_g$ is driven by a motor $M_g$ receiving its power from generator A or by any other means.

In that way, with a slight loss of efficiency, a better flexibility for the running and the regulation of the gas-turbine plant is obtained.

It is, of course, necessary to regulate the temperature of the gas led into the gas turbine and the temperature of the compressed air coming from the air preheater $R_v$ the latter regulation being necessarily done in an independent way. These regulations can be carried out in different ways according to the respective temperatures and volumes of the gas from the turbine and of the compressed air for the furnace.

Figure 5:
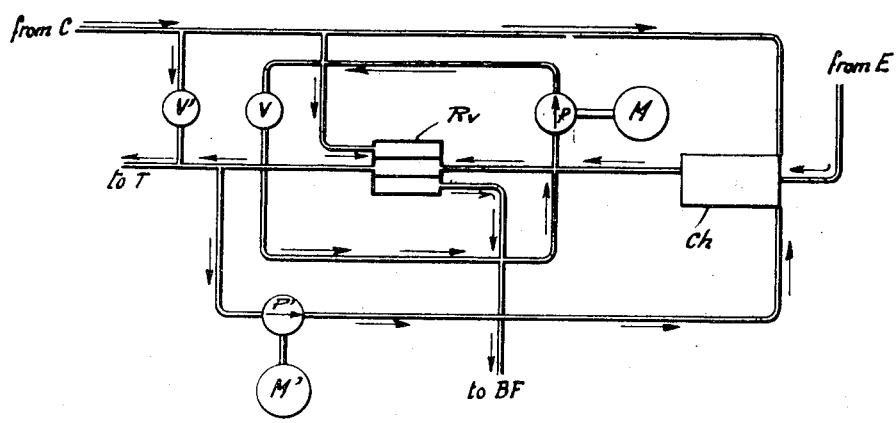
Fig. 5 represents different ways of regulating the temperature of the compressed air, and the temperature of the gas turbine plant.

With that object, it is possible to regulate the temperature of the compressed air coming from the compressor C for instance by partially bypassing the preheater $R_v$ controlled by a valve V for lowering the air temperature or, otherwise, by re-cycling the air by means of a blower P for raising the air temperature as shown in Fig. 5. The regulation of the gas temperature for the gas turbine T can be obtained through similar means as for instance through a by-pass controlled by a valve $V'$ for the air coming from the compressor C, preventing a part of the air flow from passing through the combustion chamber and through the preheater $R_v$ (in the case of a wanted decrease of temperature at the inlet of the gas turbine) or also, in the opposite case, (in the case of a desired increase of temperature at the inlet of the gas turbine) by a re-cycling of the air feeding the turbine by means of a blower $P'$ driving a part of corresponding flow either above pre-heater $R_v$, or above the set formed by the combustion chamber $C_h$ and the preheater $R_v$. The blowers P and $P'$ are respectively driven by motors M and $M'$.

Figure 6:
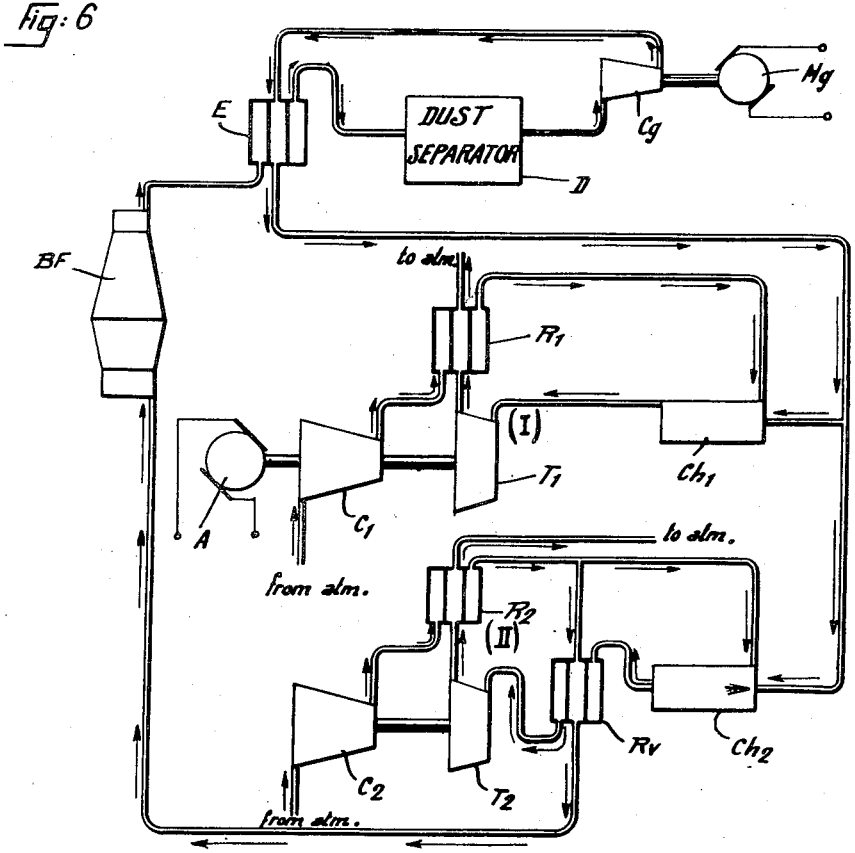
Fig. 6 is a variant of the diagram of the plant with two groups of gas-turbines securing separately the production of compressed air and of power.

It may be advantageous in certain cases to separate the production of the compressed air from the production of electric power. In that case two sets of gas turbines will be used, as shown in Fig. 6, given as a non-limitative example. In that figure, the gas turbine set I drives the generator A for the production of electric power and the gas turbine set II produces the compressed air. Gas compressor $C_g$ is independently driven by a device similar to the device in Fig. 4.

Figure 7:
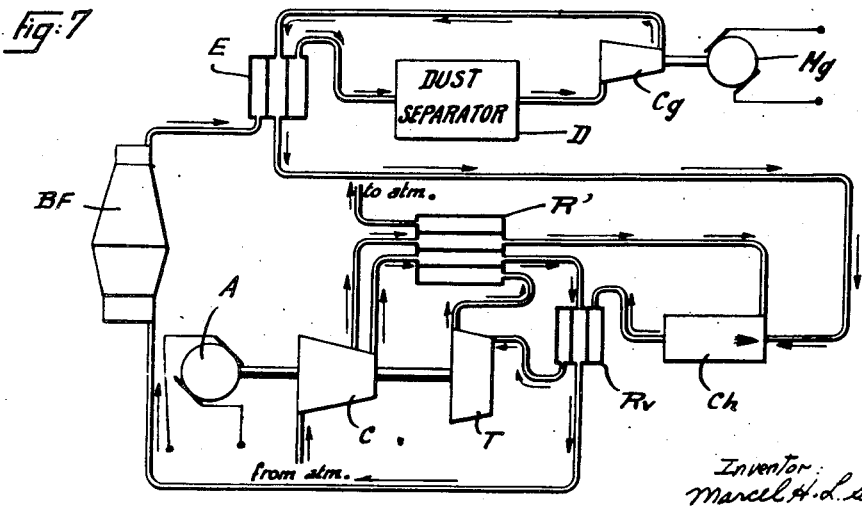
Fig. 7 is a variant of Fig. 4 in which compressed air is tapped from an intermediate stage of the compressor.

In most of the above examples, the air pressure has been assumed to be equal to the working pressure of the gas turbine; in other words the compressed air for the furnace and the combustion air for the gas turbines are taken at the outlet of the air compressor. However, in Fig. 2, the case of an air pressure lower than the pressure feeding the turbine has been considered. The pressure may also be higher and Fig. 7 shows such an example. As in Fig. 2, recuperator $R'$ has three different circuits, the first for the exhaust gas from the turbine, the second for preheating the compressed air for the furnace and the third for preheating the combustion air for the combustion chamber $C_h$ of the gas turbine T.

As a variant, it is possible to improve the cycle of the gas turbine plant by using two turbines $T_1T_2$ and two compressors $C_1C_2$ with intermediate cooler $R_1$ and intermediate combustion chamber $Ch_2$, as shown in Fig. 8. The compressed air is taken, in that case, between the series of the two compressors $C_2$, $C_1$, before cooler $R_1$.

In all the above mentioned diagrams, the air preheater $R_v$ is a delicate part, because it works at high temperatures. It is possible to omit this part, using straight away as air for the furnace, combustion gas taken at the outlet of the combustion chamber $C_h$, this gas containing an important excess of air due to the limitation of temperature admissible for the gas turbine. The increase of air temperature is then obtained by internal combustion. However, in order to avoid any trouble in operation of the blast furnace due to a diminution of the oxygen content of the air, it is possible to adjust this content by an injection at $i$ of oxygen or over oxygenated air (Fig. 9). The regulation of the gas temperature at the inlet of the turbine is then obtained by a by-pass $b$ of combustion chamber $C_h$ controlled by a valve V.

What I claim is:

1. The combination with a supercharged, sealed blast furnace having a gas exhaust circuit gas-tightly connected to the top part thereof, of a power and compressed air supply plant comprising a supercharger adapted to deliver high-pressure air to said blast furnace, a gas compressor in said gas exhaust circuit for raising the pressure of exhaust gases flowing therethrough, at least one combustion chamber, piping means between said compressor and said combustion chamber for supplying the latter with said exhaust gases, further piping means between said supercharger and said combustion chamber for supplying the latter with a fraction of high-pressure air delivered by said supercharger, at least one gas turbine fed with motive gas issuing from said combustion chamber, power generating means for producing available external power, and mechanical coupling means between said gas turbine, said supercharger and said power generating means, whereby said supercharger and said power generating means are driven from said turbine.

2. The combination as claimed in claim 1, further comprising a motor for driving the gas compressor.

3. The combination as claimed in claim 2, wherein the gas compressor is driven by an electric motor, and the power generating means is an electric generator adapted to energize said electric motor.

4. The combination as claimed in claim 1, further comprising a dust catcher in the gas exhaust circuit upstream of the gas compressor, and a heat exchanger including a heating gas line upstream of said dust catcher and a heated gas line downstream of said gas compressor, the discharge pressure of said gas compressor being substantially equivalent to the pressure of the air delivered to the blast furnace.

5. The combination as claimed in claim 1, further comprising a pressure lock, at the top part of the blast furnace, including two spaced bells enclosing therebetween a gas-tight compartment connected to the gas exhaust circuit, valve means in said gas exhaust circuit in the vicinity of said compartment, a by-pass circuit across said valve means including an auxiliary compressor.

References Cited in the file of this patent

UNITED STATES PATENTS

| Number | Name | Date |
|---|---|---|
| 991,179 | Stodola | May 2, 1911 |
| 1,727,100 | Edwards | Sept. 3, 1929 |
| 2,131,031 | Avery | Sept. 27, 1938 |
| 2,163,762 | Noack | June 27, 1939 |
| 2,225,311 | Lysholt | Dec. 17, 1940 |
| 2,446,388 | Ramseyer et al. | Aug. 3, 1948 |
| 2,496,407 | Pfenninger | Feb. 7, 1950 |